I. M. ALGUIRE.
GEAR HOLDING DEVICE.
APPLICATION FILED DEC. 27, 1915. RENEWED AUG. 30, 1916.
1,201,228.
Patented Oct. 17, 1916.
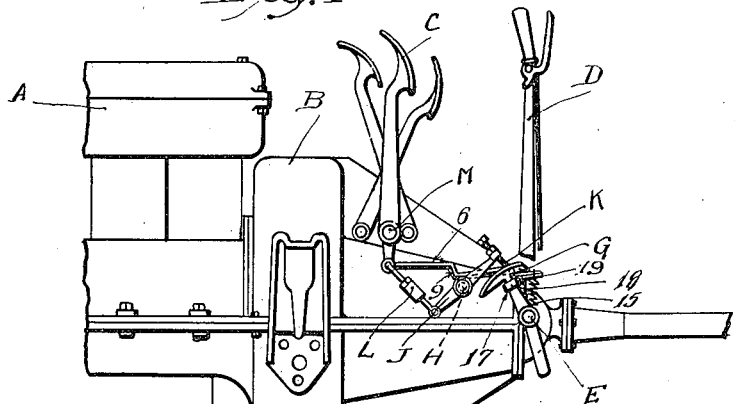
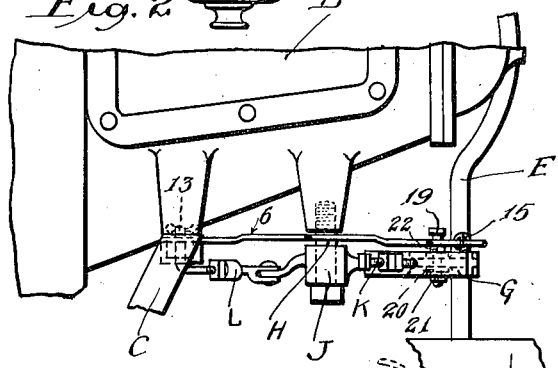
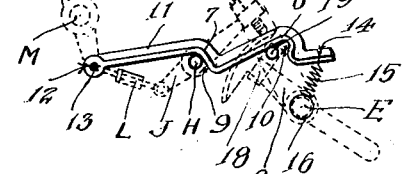
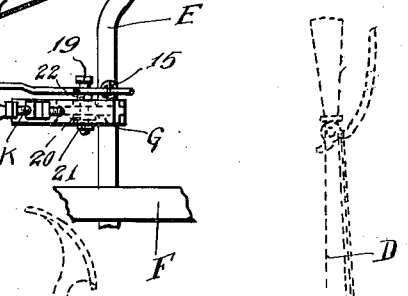
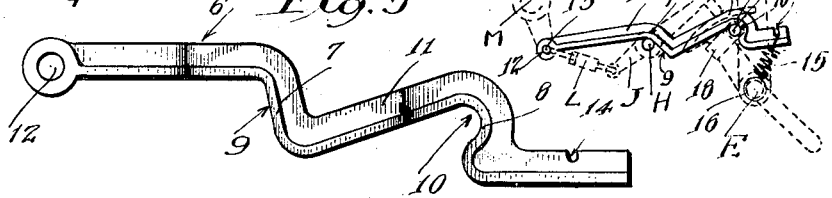
Witnesses
Inventor
Ivan M. Alguire
By Frederick Whyper
atty

UNITED STATES PATENT OFFICE.

IVAN M. ALGUIRE, OF RIVERSIDE, CALIFORNIA.

GEAR-HOLDING DEVICE.

1,201,228.     Specification of Letters Patent.     Patented Oct. 17, 1916.

Application filed December 27, 1915, Serial No. 68,720. Renewed August 30, 1916. Serial No. 117,803.

*To all whom it may concern:*

Be it known that I, IVAN M. ALGUIRE, a citizen of the United States, residing at Riverside, in the county of Riverside and State of California, have invented a new and useful Gear-Holding Device, of which the following is a specification.

In automobiles of a well-known type in which the transmission mechanism is operated by a pedal, it is necessary that the operator hold the pedal in a certain position with his foot in order to keep the gears of the transmission in "low" or "first speed". In climbing grades this holding of the pedal in a certain position becomes extremely tiresome and in some instances proves dangerous in that the operator unconsciously relaxes the pressure on the pedal and this allows the gears to slip into "high" position, resulting in the stalling of the motor and the slipping of the "low" speed drum in its band causing undue wear on both drum and band and the heating and burning of the band and drum.

It is therefore the primary object of my invention to provide a means for holding the pedal and subsequently the gears in "low", in order that the above-noted objections will be overcome.

An object of importance is to provide means of the above-mentioned character for holding the gears in a certain relation which may be readily attached to an automobile without requiring any change in the construction thereof and will not in any way interfere with the operation of the transmission mechanism.

A further object is to provide a gear-holding device which is entirely out of view and capable of being quickly, easily and reliably operated.

Other objects and advantages will appear from the subjoined detail description.

The accompanying drawings illustrate the invention.

Figure 1 is a side elevation of a portion of the engine and transmission of an automobile showing my gear-holding device attached thereto; Fig. 2 is a fragmentary top plan view of Fig. 1; Fig. 3 is a detail side elevation showing the transmission and the gear holding device in low position; Fig. 4 is a view similar to Fig. 3 showing the gear holding device and in locked position; and Fig. 5 is a detail side elevation of the holding device proper.

Referring to the drawings by characters of reference, A designates the engine of a motor vehicle, B the transmission housing, C the gear shifting pedal held in back position by a spring, not shown, and D the emergency brake and clutch lever. The lever D is mounted upon the transverse shaft E journaled in the chassis F of the vehicle and a cam member G is fixed to the shaft E. Pivoted intermediate its ends upon a shaft H which projects from the housing B is a rocker arm J. One end of the arm J is a cam-engaging pin K which rides upon the cam G. A link L is pivoted to the other end of the arm J and to the lower end of the pedal C, said pedal being pivoted at M to the housing C intermediate its ends.

The mechanism above described is found on well-known types of automobiles in general use throughout the country and it is with this mechanism that my gear-holding device coöperates.

The means for holding the pedal C in such position that the gears will be held in a selected position against the action of the spring, not shown, comprising a bar 6 of ziz-zag construction, said bar being provided with offsets 7 and 8 which provide a cam shoulder 9 and a locking shoulder 10 respectively. On the top of the bar extending the length thereof is formed a reinforcing rib 11. An eye 12 is formed at one end of the bar and is pivotally connected as at 13 with the lower end of the pedal C. The bar extends rearwardly of the cam shoulder 9, slides upon the shaft H and near its other end is provided with a notch or recess 14 in the rib 11. A retractile spring 15 having an eye 16 surrounding the bar and engaging in the recess 14 is fastened to the shaft E. Mounted upon the cam G is locking means 17 adapted to coöperate with the locking shoulder 10 on the bar 6. This means comprises a U-shaped clamp 18 which straddles a portion of the cam and is held in place by a bolt 19 which projects from the cam and clamp a distance sufficient to engage and lock with the shoulder 10 on the bar 6. The clamp 18 near its free ends is provided with alined openings 20 through which the bolt 19 is inserted and nuts 21 and 22 are mounted upon the screw-threaded portion of the bolt so as to engage opposite sides of the U-shaped clamp and cause it to bind against the cam.

It will be noted that the entire device comprising the bar 6, spring 15, clamp 18 and bolt 19 may be attached without changing the construction of the automobile or necessitating the making of bolt holes in any parts of the automobile mechanism and this is considered one of the most essential features of this invention.

When the device and coöperating mechanism are in the position shown in Fig. 3 the pedal C is in forward position, required to hold the gears in "low". As the pedal moves forwardly from the position shown in Fig. 1 to that shown in Fig. 3, the bar 6 is pushed rearwardly causing the cam shoulder 9 to drop behind the shaft H and the bar 6 is then pulled down by the action of the spring 15 so that the shoulder 10 is disposed rearwardly of the bolt 19. It will be noted that the lever D is in forward position at this time and to lock the pedal so that the gears will be held in "low" the lever D is grasped and pulled rearwardly causing the cam G to move correspondingly and the bolt 19 to engage with the locking shoulder 10. In this connection it will be noted that the locking shoulder 10 is under-cut or inwardly recessed in order that slipping of the bar 6 relative to the bolt will be prevented and a reliable locking and holding of the bar is provided, thus the transmission will be held in "low" speed position without requiring that the operator hold the pedal C in forward position with his foot. To release the bar 6 the lever D is again pushed forwardly into its normal running position and this causes the cam G and bolt 19 to move from engagement with the shoulder 10 and the pedal C is allowed to return to its lowermost position which causes the transmission mechanism to be moved into "high" speed position. The pedal C is caused to remain in "high" speed by the action of a spring not shown, and which is mounted within the transmission housing B.

As shown in Fig. 3, the transmission mechanism is in "high" speed position and the bar 6 slides freely upon the shaft H when the pedal is shifted into "high" and "low" positions. When the pedal is in "low" position and the shoulders 9 and 10 are disposed in the rear of the shaft H and bolt 19, the bar will slide over the shaft and bolt without interference with the latter, when the pedal is released and moves back into "high" position. Unless the cam G with the bolt 19 thereon is moved into locking position by shifting the lever D the bar 6 when the pedal is in "low" position does not lock and is free as above stated to move back and forth, relative to the bolt 19 and shaft H. As the pedal moves from "low" into "high" position the cam shoulder rides on the shaft H and lifts the locking shoulder 10 clear of the bolt 19 against the action of the spring 15.

With reference to the foregoing description and accompanying drawings it will be seen that I have provided a gear-holding device in the form of an attachment which can be manufactured cheaply and quickly and easily attached to a certain well-known type of automobile.

It is understood that the invention is not limited to the exact construction shown in the drawings and described above, but that deviations therefrom may be made within the spirit and scope of the invention.

I claim:

1. In an automobile gear-holding device the combination with the gear shifting pedal, transmission gears, brake lever and the connections between the lever and pedal, of means for holding the pedal in a position whereby the gears operated by the pedal are held in a certain selected position, comprising a locking bar connected with the pedal, and a locking member carried by the connections between the lever and pedal and moving into and out of locking position with the bar upon movement of the lever.

2. In an automobile gear-holding device the combination with the gear shifting pedal, transmission gears, brake lever and the connections between the lever and pedal, of means for holding the pedal in a certain position whereby the gears operated by the pedal are held in a certain selected position comprising a locking bar connected with the pedal, and a locking member carried by the connections between the lever and pedal and moving into and out of locking position with the bar upon movement of the lever, said bar having a locking shoulder thereon for coöperation with the locking member.

3. The combination with the gear shifting pedal of transmission mechanism, a brake lever and a connection between the lever and pedal, of means to lock the pedal in a certain position comprising a locking bar pivoted to said pedal and having a cam surface thereon resting upon a portion of said connection, a locking member carried by the connection and moving with the movement of the lever into and out of locking relation with the bar, and spring means to normally hold the bar in position to be locked.

4. The combination with the clutch shifting pedal of transmission mechanism, a brake lever and a connection between the lever and pedal, of means to lock the pedal in a certain position comprising a locking bar pivoted to said pedal and having a cam surface thereon resting upon a portion of said connection, a locking member carried by the connection and moving with the movement of the lever into and out of locking relation with the bar, spring means to normally hold the bar in position to be locked, and a locking shoulder carried by said bar for coöperation with the locking member.

5. In a gear-holding device, the combination with the clutch shifting pedal of transmission mechanism, a brake lever, a cam operated by the clutch lever, a pivoted arm coöperating with the cam and a link connecting the arm with the pedal, of a locking bar connected with the pedal and having a cam shoulder resting on the pivot for said arm, a locking member carried by the cam and located below said pivot of the arm, said bar having a locking shoulder for coöperation with the locking member, and a spring for moving the bar into locking position.

6. In an automobile gear holding device, the combination with the gear shifting pedal, brake lever, connections between the brake lever and pedal, and transmission gears of the transmission mechanism, of means for holding the pedal in a position whereby the gears are held in a certain selected position comprising locking means carried by the pedal and connections respectively and moving into and out of locking position upon movement of the lever.

7. In an automobile gear holding device, the combination with transmission mechanism including a pedal, spring means to normally hold the pedal in high gear position, a brake lever, and connections between the brake lever and pedal and means coöperating with the pedal and connections to hold the pedal in low gear position movable into and out of locking position upon movement of the lever.

8. In an automobile gear holding device, the combination with transmission mechanism including a gear shifting pedal, a brake lever, connections between the brake lever and pedal, and spring means to normally hold the pedal in high gear position, of means associated with the pedal, connections and lever for holding the pedal in low gear position against the action of the spring means and being operated upon movement of the lever.

Signed at Los Angeles, California, this 20th day of December, 1915.

IVAN M. ALGUIRE.

Witnesses:
CHAS. J. CHUNN,
L. BELLE WEAVER.